US012614473B2

(12) United States Patent
Hafellner et al.

(10) Patent No.: US 12,614,473 B2
(45) Date of Patent: Apr. 28, 2026

(54) INCLINATION MECHANISM FOR SINGLE-TRACK DUMMY VEHICLE

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4ACTIVESYSTEMS GMBH, Traboch (AT)

( * ) Notice: Subject to any disclaimer, the term of this patent is extended or adjusted under 35 U.S.C. 154(b) by 1093 days.

(21) Appl. No.: 17/620,681

(22) PCT Filed: Apr. 20, 2020

(86) PCT No.: PCT/EP2020/061004
§ 371 (c)(1),
(2) Date: Dec. 18, 2021

(87) PCT Pub. No.: WO2020/254010
PCT Pub. Date: Dec. 24, 2020

(65) Prior Publication Data
US 2022/0101755 A1 Mar. 31, 2022

(30) Foreign Application Priority Data
Jun. 19, 2019 (DE) ..................... 10 2019 116 663.2

(51) Int. Cl.
*G09B 23/30* (2006.01)
*G01M 17/007* (2006.01)
(52) U.S. Cl.
CPC .......... *G09B 23/30* (2013.01); *G01M 17/007* (2013.01)

(58) Field of Classification Search
CPC ............................. G09B 23/30; G01M 17/007
See application file for complete search history.

(56) References Cited

U.S. PATENT DOCUMENTS

| | | | |
|---|---|---|---|
| 5,368,516 A | 11/1994 | Hoeting et al. | |
| 6,733,294 B2 * | 5/2004 | Tuluie | G01M 17/0076 |
| | | | 434/61 |
| 7,195,487 B2 * | 3/2007 | Robbins | G05B 17/02 |
| | | | 434/61 |
| 9,046,440 B2 * | 6/2015 | Stahlin | G09B 19/00 |
| 9,212,973 B2 * | 12/2015 | Weber | G01M 17/0078 |
| 9,355,576 B2 | 5/2016 | Fritz | |

(Continued)

FOREIGN PATENT DOCUMENTS

| | | |
|---|---|---|
| CN | 1611279 A | 5/2005 |
| CN | 2766912 Y | 3/2006 |

(Continued)

OTHER PUBLICATIONS

Moriguchi, M; Notice of Reasons for Refusal Patent Application 2021-561755; Nov. 21, 2023; pp. 1-2; 3-4-3 Kasumigaseki, Chiyoda-ku Tokyo 100-8915, Japan.

(Continued)

*Primary Examiner* — Freddie Kirkland, III
(74) *Attorney, Agent, or Firm* — Robert A. Blaha; Smith Tempel Blaha LLC

(57) ABSTRACT

The invention relates to a dummy system comprising a dummy element and a displaceable platform, wherein the dummy element is attached to the platform in a manner inclinable relatively to the platform.

17 Claims, 6 Drawing Sheets

(56) References Cited

U.S. PATENT DOCUMENTS

| | | | |
|---|---|---|---|
| 9,396,667 | B1 | 7/2016 | Bober et al. |
| 9,827,998 | B1 * | 11/2017 | Kelly ................ G01M 17/0078 |
| 9,870,722 | B2 | 1/2018 | Fritz et al. |
| 10,276,056 | B2 * | 4/2019 | Rasmussen ............ G09B 9/006 |
| 10,352,826 | B2 | 7/2019 | Fritz et al. |
| 10,403,164 | B2 * | 9/2019 | Tischer ................ B60G 21/007 |
| 10,955,313 | B2 | 3/2021 | Hafellner et al. |
| 11,092,515 | B2 | 8/2021 | Hafellner et al. |
| 11,125,651 | B2 | 9/2021 | Hafellner et al. |
| 11,322,039 | B2 * | 5/2022 | Minen ...................... B62H 1/00 |
| 11,932,278 | B2 * | 3/2024 | Beaurepaire ....... G01C 21/3461 |
| 11,934,190 | B2 * | 3/2024 | Trazkovich .......... G05D 1/0246 |
| 11,958,491 | B2 * | 4/2024 | Bright ................... G01M 17/06 |
| 2003/0059744 | A1 | 3/2003 | Tuluie et al. |
| 2004/0230394 | A1 * | 11/2004 | Saari ........................ G01M 7/08 |
| | | | 434/62 |
| 2005/0004257 | A1 | 1/2005 | Gernon et al. |
| 2005/0018764 | A1 | 1/2005 | Hsiao |
| 2005/0042578 | A1 | 2/2005 | Ammon et al. |
| 2005/0187641 | A1 | 8/2005 | Robbins |
| 2007/0026977 | A1 | 2/2007 | Niwa et al. |
| 2007/0269771 | A1 | 11/2007 | Lefton |
| 2014/0102224 | A1 | 4/2014 | Fritz |
| 2014/0144207 | A1 * | 5/2014 | Weber ............... G01M 17/0078 |
| | | | 73/12.07 |
| 2015/0317917 | A1 | 11/2015 | Fritz et al. |
| 2016/0054199 | A1 | 2/2016 | Fritz et al. |
| 2016/0356674 | A1 | 12/2016 | Chien et al. |
| 2017/0136842 | A1 * | 5/2017 | Anderson ............ B60G 99/002 |
| 2018/0208259 | A1 * | 7/2018 | van Wijk ................. B62D 9/02 |
| 2018/0218630 | A1 * | 8/2018 | Minen .................. G09B 19/167 |
| 2018/0286280 | A1 | 10/2018 | Rasmussen et al. |
| 2018/0306676 | A1 | 10/2018 | Wimmer et al. |
| 2019/0219486 | A1 | 7/2019 | Hafellner et al. |
| 2019/0257717 | A1 | 8/2019 | Hafellner et al. |
| 2020/0003648 | A1 | 1/2020 | Le Henaff et al. |
| 2020/0003658 | A1 | 1/2020 | Hafellner et al. |
| 2021/0020063 | A1 * | 1/2021 | Minen ...................... B62H 1/00 |
| 2021/0269111 | A1 * | 9/2021 | Kotlar ...................... B62H 7/00 |
| 2021/0291850 | A1 * | 9/2021 | Bright .................... G09B 9/058 |
| 2022/0244141 | A1 * | 8/2022 | Hafellner .................. G01S 7/40 |

FOREIGN PATENT DOCUMENTS

| | | | |
|---|---|---|---|
| CN | 102651179 | A | 8/2012 |
| CN | 203186024 | U | 9/2013 |
| CN | 105894888 | A | 8/2016 |
| CN | 205832580 | U | 12/2016 |
| CN | 106448338 | A | 2/2017 |
| CN | 109690656 | A | 4/2019 |
| DE | 102015117358 | A1 | 6/2019 |
| EP | 3 493 181 | A1 | 6/2019 |
| EP | 3 882 893 | A1 | 9/2021 |
| JP | H08-262971 | A | 10/1996 |
| JP | H09-504716 | A | 5/1997 |
| RU | 67754 | U1 | 10/2007 |

OTHER PUBLICATIONS

Moriguchi, M; (Jpo English Translation) Notice of Reasons for Refusal Patent Application 2021-561755; Nov. 21, 2023; pp. 1-3; 3-4-3 Kasumigaseki, Chiyoda-ku Tokyo 100-8915, Japan.

Vertrab Uber Die Internationale Zusammenarbeit Auf Dem Gebiet Des Patentwesens (International Search Report); Internationale Recherchenbehörde; Jul. 2, 2020.

AB Dynamics: "Driverless Motorbike", Apr. 11, 2018; found on the Internet: https://www.youtube.com/watch?v=1KUym9amXpc&feature=emb_rel_end.

Youcar: "First-Ever Autonomous Bike Demonstration—BMW R 1200 GS"; Sep. 12, 2018; found on the Internet: https://www.youtube.com/watch?v=VaZITsoj0Hc.

Anonymous "4activeSystems—4activeMC scooter & motorbike"; Oct. 18, 2018; found on the Internet on Jun. 19, 2020.

Anonymous "4activeSystems—4activeBS static bicyclist"; May 18, 2019; Found on the Internet on Jun. 19, 2020.

DE 10 2015 117 358 A1; machine translation; Espacenet; Apr. 13, 2017.

European Commission Eighth Framework Programme Horizon 2020 GA No. 634149; "PROSPECT Proactive Safety for Pedestrians and Cyclists"; Apr. 28, 2018; pp. 1-18.

European Patent Office; International Search Report; Search Strategies; PCT/EP2020/061004; Jul. 2, 2020.

European Patent Office; International Search Report; English Translation; PCT/EP2020/061004; Jul. 2, 2020.

First Office Action in Application No. 2020800319557; pp. 1-11; Dec. 19, 2023; China National Intellectual Property Administration; No. 6, Xitucheng Lu, Jimenqiao Haidian District, Beijing City, 100088, China.

English Translation of the First Office Action in Application No. 2020800319557; pp. 1-10; Dec. 19, 2023; China National Intellectual Property Administration; No. 6, Xitucheng Lu, Jimenqiao Haidian District, Beijing City, 100088, China.

Communication Pursuant to Article 94(3) in Application No. 20 722 239.9; pp. 1-8; Jan. 15, 2024; European Patent Office; 80298; Munich, Germany.

\* cited by examiner

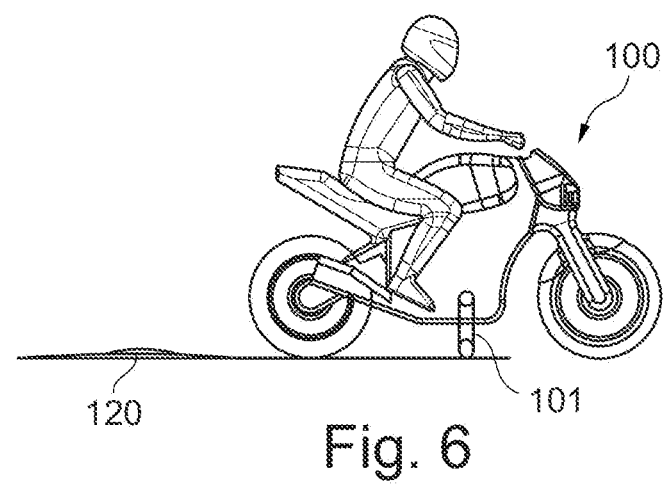
Fig. 6
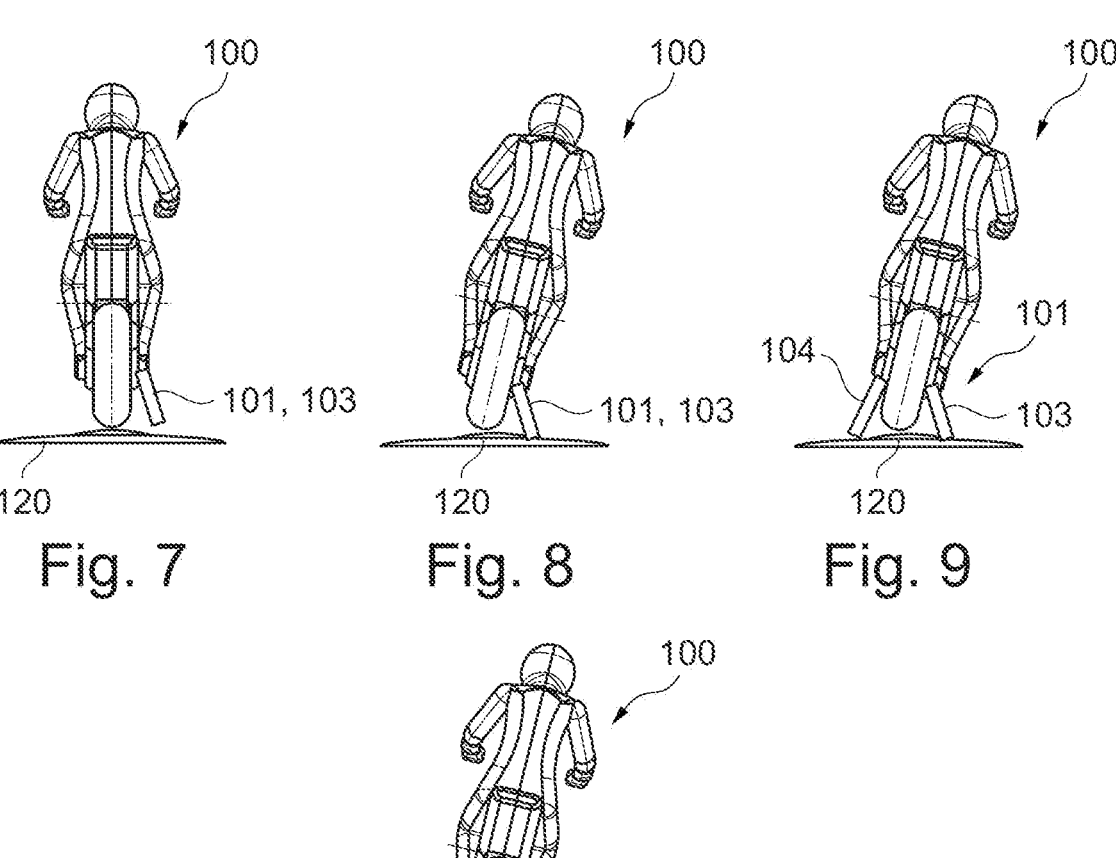
Fig. 7    Fig. 8    Fig. 9
Fig. 10

INCLINATION MECHANISM FOR SINGLE-TRACK DUMMY VEHICLE

This application is a national US phase of PCT/EP2020/061004 which claims the benefit of the filing date of the German Patent Application No. 10 2019 116 663.2 filed 19 Jun. 2019, the disclosure of which is hereby incorporated herein by reference.

TECHNICAL FIELD

Embodiments of the present invention relate to a dummy system, in particular for testing vehicle assistance systems.

TECHNOLOGICAL BACKGROUND

In automotive engineering, increasingly more assistance systems are utilized which actively monitor the environment of the vehicle and passively or actively intervene in the controlling of the vehicle. In particular assistance systems for realizing autonomous driving have to be extensively tested. Thus, assistance systems have to undergo comprehensive tests, to avoid incorrect assessments of the assistance systems.

During a test run of assistance systems, collisions between the object to be tested and the dummy element may indeed be caused. In order to cause a collision situation which is close to reality, such as a collision of two vehicles or of a vehicle with a person in traffic, the vehicle to be tested and the dummy element are set into motion. Thereby, in particular driver assistance systems may be tested in a manner close to reality.

In order to test an assistance system for all possible situations, it is necessary that the vehicle and the dummy element are moving towards each other from test to test from different directions, and thereby depict driving dynamics which are close to reality, in particular when driving along curves.

SUMMARY OF THE INVENTION

There may be a need to provide a dummy system, wherein dummies, in particular when driving along curves, simulate a driving behavior which is close to reality.

The subject matter of the independent claims is provided.

According to an aspect of the invention, a dummy system is described which comprises a dummy element (in particular a single-track dummy element, such as a bicycle or a motorcycle) and a displaceable platform, wherein the dummy element is attached on the platform in a manner inclinable with respect to the platform.

According to a further aspect of the present invention, a dummy system is described which comprises a dummy element which is displaceable along a ground. Furthermore, the dummy system comprises an inclination mechanism, wherein the inclination mechanism is coupled with the dummy element and is configured such that the dummy element is inclinable relatively to a ground.

According to a further aspect, a method of operating the above-described dummy system is described. According to the method, the dummy element is inclined relatively to the ground.

For example, the dummy element may represent a bicycle driver, a motorcycle driver, a moped driver, or a three-track vehicle. For example, also inclinations of passenger cars and trucks are possible, to simulate the driving along curves.

The inclination mechanism in particular may comprise an eccentric drive, a crank drive, or a curve disk for controlling the inclination angle.

With the inclination according to embodiments of the invention, for example an inclination angle of the dummy element relatively to a ground, may be adjusted, over which the dummy element is displaceable. Furthermore, the dummy element may be arranged on a displaceable platform, wherein the inclination mechanism adjusts the inclination angle between the dummy element and the displaceable platform.

The dummy element, in particular a dummy vehicle, thereby simulates the inclination when driving along curves. In the case that the dummy element is a motorcycle driver and a motorcycle, respectively (e.g. a single-track vehicle), the inclination of the motorcycle during driving along a curve is therefore adjusted and simulated. In the case that the dummy element is a 2- or 3-track vehicle, such as a car, the inclination of the car relatively to a ground or the platform may be adjusted by adjusting a distance between the car wheel and the bodywork, for example. Thus, a realistic simulation of a real traffic situation is created, such that driver assistance systems may be tested in a manner closer to reality.

According to a further exemplary embodiment, the inclination mechanism comprises an actuator and a coupling device, wherein the actuator can move the coupling device, in particular in a translatory and/or rotational manner, such that an inclination of the dummy element is adjustable.

The coupling device may be constituted by a rigid holding rod or a tube, for example, which is coupled to the dummy element in a rigid or hinged manner. On the other hand, the coupling device may be directly supported at the ground by rollers, for example, or may be pivotably coupled to a displaceable platform. Thus, due to pivoting or due to a change of the length of the coupling device, an adjustment of the inclination angle of the dummy element is possible.

The adjustment of the coupling device is performed by an actuator. In particular, the actuator is an electric drive and a servo-electric linear drive, respectively.

According to a further exemplary embodiment, the coupling device is made of a transparent, in particular radar-transparent, material. Thus, in particular incorrect measurements of driver assistance systems to be tested are reduced, which may result from a reflection at the coupling device.

According to further exemplary embodiment, the coupling device is arranged between the ground and the dummy element. For example, the coupling device may be supported directly at the ground by rollers, to reduce a friction with respect to the ground. Alternatively, the coupling device may also be displaced over a ground in a sliding manner.

According to a further exemplary embodiment, the coupling device comprises a holding rod which is coupled to the dummy element and the actuator, such that the holding rod is movable for inclining the dummy element by the actuator.

For example, the inclination mechanism comprises at least one holding bar/holding rod which connects the dummy element and the platform, wherein the holding bar is pivotably attached to the platform. The pivoting position and the inclination angle, respectively, of the holding bar is adjustable and controllable, respectively, via an actuator. The actuators are e.g. integrated in attachment elements, e.g. of the holding bars, or the platform.

According to a further exemplary embodiment, the length of the holding rod is adjustable by the actuator, wherein the holding rod in particular is telescopically retractable and extendable.

Due to the change of the length of the holding rod, the inclination of the dummy element may be adjusted, for example. Thereby, the holding rod may consist of multiple elements which are slidable into each other, to therefore be telescopically retractable and extendable.

Furthermore, the holding rod may be guided in a guiding rail which is fixedly attached to the dummy element or to the platform, for example. The holding rod may correspondingly move relatively to the guiding rail, to correspondingly adjust an inclination angle.

For example, the holding rod may comprise a threaded region and may form a threaded rod, respectively, which may be rotated by the actuator and may be correspondingly retracted and extended in a sleeve with a corresponding thread. Thus, a robust and exactly adjustable threaded spindle drive is provided.

According to a further exemplary embodiment, the holding rod is pivotably attached to the dummy element, to correspondingly adjust a distance to the ground and correspondingly the inclination by pivoting. The pivoting position of the holding rod may be adjusted by the actuator, for example. For example, the actuator is a rotatable control disk, at which the holding rod is hingedly coupled. By rotating the control disk, a pivoting position of the holding rod may be correspondingly adjusted.

According to a further exemplary embodiment, the coupling device comprises a further holding rod which is coupled to the dummy element and the actuator or a further actuator, such that the further holding rod is movable for inclining the dummy element by the actuator. In particular, the dummy element is arranged between the holding rod and the further holding rod.

For example, both holding rods may be pivotable in a pivoting direction, to therefore pivot the dummy element correspondingly. Furthermore, the length of both holding rods may be adjustable, such that the one holding rod is extended by the actuator, while the other further holding rod is shortened, for example.

Thus, also a pivoting of the dummy element may be induced. The holding rods may be pivoted or length-adjusted via a common actuator, for example. Alternatively, to each holding rod, a corresponding actuator may be assigned, to specifically adjust the holding rod and the further holding rod.

According to a further exemplary embodiment, the coupling device comprises a control lever which is hingedly coupled to the holding rod and the further holding rod. The control lever is coupled with the actuator such that, by the actuator, the control lever is movable, to adjust an inclination of the holding rod and the further holding rod.

For example, each holding rod comprises a center of rotation (e.g. via a hinge connection, ball joint) at the dummy element. For example, at their free ends, the holding rods are hingedly coupled with the control lever. When the actuator translationally displaces the control lever in a direction, a pivoting of the holding rod around its center of rotation is induced. Thus, also via the further coupling of the holding rods with the dummy element, an inclination of the dummy element is controlled.

According to a further exemplary embodiment, the dummy system comprises a platform which is displaceable over the ground, on which the dummy element is inclinably attached.

The platform is drivable by at least one roller element and is displaceable along a ground. The platform comprises the base body which forms a platelike shape. This means that its extension within a bottom plane is significantly larger than its thickness in a vertical direction, for example. The base body comprises a bottom surface and an opposing attachment surface. The base body is laid on a ground with its bottom surface. In the bottom surface, the at least one roller element is drivably arranged, which protrudes at least partially out of the base body and thus provides a distance between the base body and the ground. On the attachment surface, the dummy element is fixed, for example by an attachment device which in particular comprises an inclination mechanism.

According to a further exemplary embodiment, the coupling device (e.g. the holding rods) are hingedly attached on the platform. For example, when the coupling device comprises the above described holding rods, they may be hingedly coupled with the platform. Thus, via pivoting the holding rods, an inclination angle of the dummy element may be adjusted.

According to a further exemplary embodiment, the actuator is arranged in or on the platform. Alternatively, the actuator may be arranged in the dummy element itself, for example, and may be coupled by wire or inductively with a current source in the platform, for example, to receive a drive energy.

According to a further exemplary embodiment, a current source, in particular a (rechargeable) battery, is arranged in the platform for a current supply of the actuator.

According to a further exemplary embodiment, the coupling device comprises a pivotable holding rod which is attached to the platform, which is pivotable by the actuator, to incline the dummy element.

According to a further exemplary embodiment, the coupling device comprises a traction rope which is coupled with the platform and the dummy element such that, when pulling the traction rope by the actuator, an inclination of the dummy element with respect to the platform is adjustable.

For example, the actuator may comprise a drivable rope roller on which the traction rope can be rolled and unrolled. For example, the traction rope may comprise a circular cross-section, or a rectangular cross section, and may be configured as a belt, for example. For example, the traction rope is coupled to the dummy element and the platform, such that, when the length of the rope between the dummy element and the platform is shortened, a tensile force inclines the dummy element in the corresponding direction. In order to pivot the dummy element back in an initial position, for example a retaining spring which is configured as a tension- or compression spring, for example, may be coupled between the platform and the dummy element.

According to a further exemplary embodiment, the coupling device comprises a further traction rope, wherein the dummy element is arranged between the traction rope and the further traction rope. The traction rope and the further traction rope are coupled with the platform and the dummy element such that, when pulling the traction rope and when releasing the further traction rope by the actuator (or the actuators which are respectively assigned to the respective traction rope), an inclination of the dummy element with respect to the platform is adjustable. In other words, the respective traction rope pulls the dummy element in the corresponding inclination direction, to adjust a desired inclination angle. The length of the rope of the other traction rope leads to a fixation of the dummy element in the desired inclination position.

According to a further exemplary embodiment, the coupling device comprises a control belt and three (or more) belt rollers which are spaced apart, around which the control belt is guided. The belt roller is attached to the dummy element and two belt rollers are arranged at opposing sides of the dummy element on the platform. The actuator is coupled to at least one of the belt rollers for controlling it, such that, when rotating the belt roller, the inclination of the dummy element with respect to the platform is adjustable. Thus, a belt drive is provided, by which the dummy element may be exactly adjusted in a desired inclination angle.

The control belt may be configured as toothed belt and the belt rollers may comprise corresponding engagement teeth. Alternatively, the control belt may be configured as tension belt and may be coupled with the belt rollers via static friction.

According to a further exemplary embodiment, the dummy system comprises a control unit which controls the inclination mechanism, wherein the control unit is config-ured to determine a corresponding inclination angle based on a velocity of the dummy element over the ground. For example, the control unit may be integrated in the dummy element or the platform. Furthermore, the control unit may be arranged spaced apart from the dummy element and may wirelessly transmit corresponding control signals to the actuator.

According to a further exemplary embodiment, the dummy element comprises a steerable wheel, wherein a steering angle of the steerable wheel is adjustable corre-spondingly to an adjusted inclination angle.

Furthermore, the dummy element, e.g. as bicycle- or motorcycle dummy, may comprise a steering rod for steering a front wheel. Additionally to the curve inclination of the dummy element, when the dummy element is driving along a curve, a rotation of the steering rod by a further actuator may serve for a realistic simulation.

According to a further exemplary embodiment, the dummy element is a car which comprises a bodywork and at least one wheel, wherein by the inclination mechanism, a distance between the bodywork and the wheel is adjustable. In particular, the inclination mechanism is integrated in a shock absorber of the car. Furthermore, the inclination mechanism may comprise a holding rod which is arranged between the wheel and the bodywork in a retractable and extendable manner. Thus, a pitching motion of the car while driving along a curve or also during a break application may be simulated.

The actuators may be supplied with energy by a battery operation. Alternatively or additionally, pneumatic or hydraulic actuators may be utilized.

By the inclination mechanism, inclination angles between 0° and 45°, in particular up to 25° or 35°, may be adjusted.

The inclination angle is calculated in dependence of the velocity and the radius of the curve along which the platform is driving.

The calculation may be calculated onboard by a control unit in the dummy element, the platform or in a central station, and may then be transmitted, e.g. by radio commu-nication.

An actuator, e.g. a servomotor, may be centrally arranged in the dummy element and may be coupled to one or two inclinable holding rods (bars or tubes), for example via a coupling rod.

The holding rods and tubes (guiding tubes/guiding rods), respectively, may be 400 mm long and may comprise a diameter of approximately 30 mm.

For example, the dummy element is centrally arranged between two holding rods. The holding rods are hingedly coupled with the platform and the dummy element. The distance between the holding rods (guiding tubes/guiding rods) is e.g. 200 mm.

The holding rods (bars) are configured optically transpar-ent and radar transparent by a suitable material selection.

The holding rods are attached by a rotatable mounting at the bottom side on the platform and at the top side at the dummy object. The mounting is rotatable around the longi-tudinal axis of a fulcrum pin. Furthermore, a ball joint may be utilized.

The current supply is performed via a battery in the dummy or via a battery in the platform, for example.

Furthermore, the system elements of the inclination mechanism, such as the battery and/or the dummy element, may be attached by a magnetic attachment, e.g. via magnets on the platform or via a hook and loop solution.

The center of rotation for the inclination may be the bearing point at the ground or the bearing point of the wheels on the platform.

An overload on the motor in case of a collision is reduced by friction in the guidings and holding rods, respectively.

It is noted, that the here described embodiments merely constitute a limited selection of possible embodiment vari-ants of the invention. Thus, it is possible to combine the features of single embodiments in a suitable manner with each other, such that, for a person skilled in the art, by the here explicit embodiment variants, a plurality of different embodiments has to be considered as obviously disclosed. In particular, some embodiments of the invention are described with device claims and other embodiments of the invention are described with method claims. However, when reading this application, it is immediately clear for the person skilled in the art, that, unless explicitly otherwise specified, addi-tionally to a combination of features which belong to one type of subject matter of the invention, also an arbitrary combination of features is possible which belong to different types of subject matters of the invention.

DETAILED DESCRIPTION OF EXEMPLARY EMBODIMENTS

In the following, for further explanation and for a better understanding of embodiments of the present invention, embodiments are described in more detail with reference to the accompanying drawings.

FIGS. 6 to 8 show a dummy system with a motorcycle driver as dummy element and an inclination mechanism with a holding rod, according to an exemplary embodiment of the present invention.

FIG. 9 shows a dummy system with a motorcycle driver as dummy element and an inclination mechanism with two individually controllable holding rods, according to an exemplary embodiment of the present invention.

FIG. 10 shows a dummy system with a motorcycle driver as dummy element and an inclination mechanism with a hinged holding rod, according to an exemplary embodiment of the present invention.

Same or similar components in different figures are provided with the same reference numbers. The illustrations in the figures are schematic.

Figures 1, 2, 3, 4, 5:
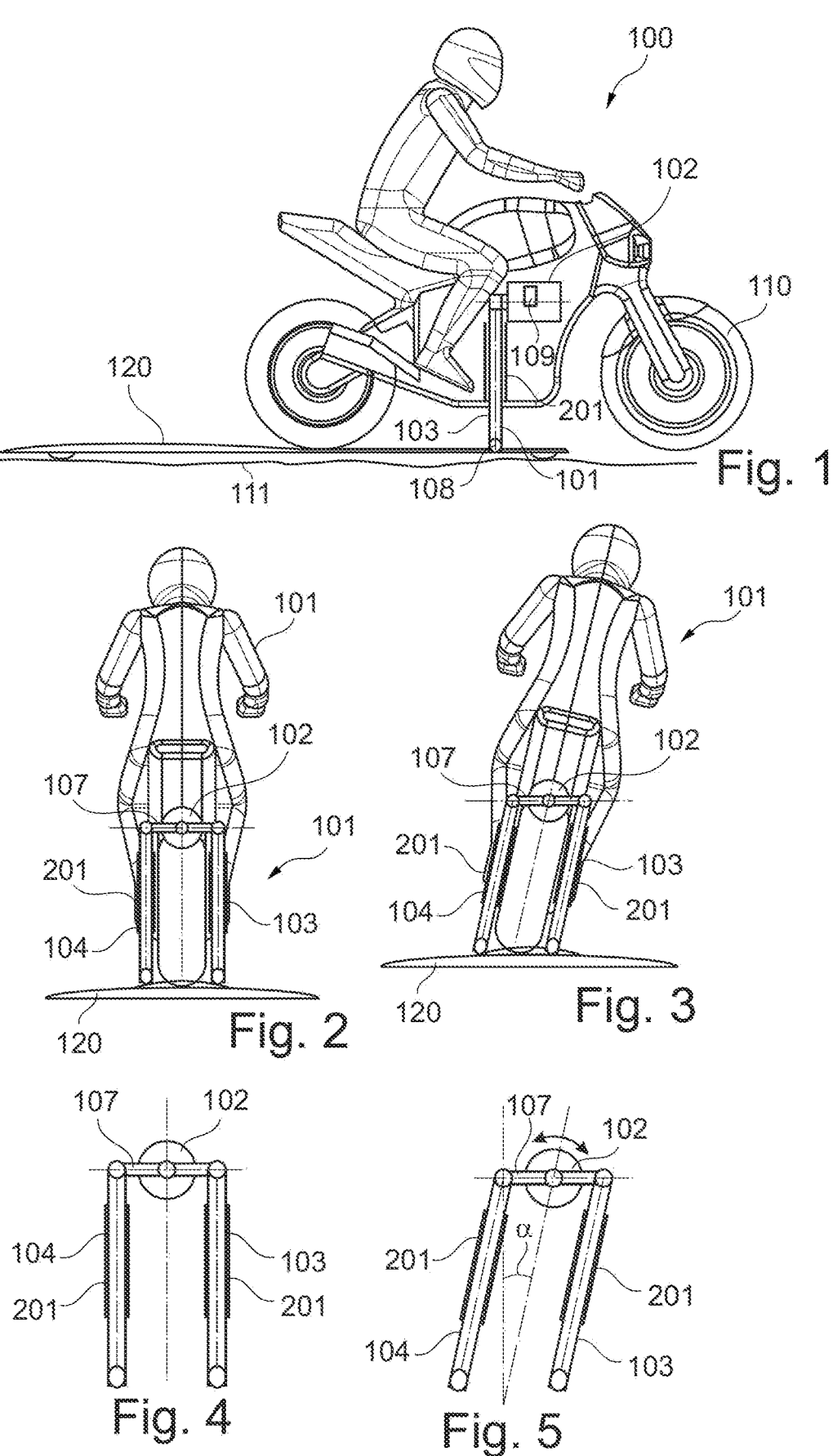
FIGS. 1 to 3 show a dummy system with a motorcycle driver as dummy element, according to an exemplary embodiment of the present invention.
FIGS. 4 and 5 show the inclination mechanism of the embodiment of the FIGS. 1 to 3.

FIGS. 1 to 3 show a dummy system with a motorcycle driver as dummy element 100, according to an exemplary embodiment of the present invention. FIGS. 4 and 5 show the inclination mechanism 101 of the embodiment of the FIGS. 1 to 3. An actuator 102, e.g. a servo motor, may be centrally arranged in the dummy element 100 and may be coupled to one or two inclinable holding rods 103, 104 (bars or tubes), for example via a coupling rod (e.g. the control lever 107). The holding rods 103, 104 are attached by a rotatable mounting at the bottom side on the platform 120 and at the top side at the dummy element 100. The mounting is rotatable around a longitudinal axis of a fulcrum pin. Furthermore, a ball joint may be utilized. In FIG. 5, an inclination angle $\alpha$ of e.g. 20° is illustrated.

The dummy element 100 is inclinably attached on the platform 120. The platform 120 is drivable by at least one roller element and is displaceable along a ground. The holding rod 103 may be guided in a guiding rail 202, for example, which is fixedly attached, for example at the dummy element 100 or at the platform 120. The holding rod 103 may correspondingly move relatively to the guiding rail 202, to correspondingly adjust an inclination angle $\alpha$. Furthermore, the holding rod 103 may be coupled to the platform 120 by a hinge connection 108.

Furthermore, the dummy element 100 may comprise a steerable wheel 110 which may be steered corresponding to the inclination angle $\alpha$.

As illustrated in FIG. 2 to FIG. 4, the coupling device comprises a control lever 107, for example, which is hingedly coupled to the holding rod 103 and the further holding rod 104. The control lever 107 is coupled with the actuator 102, such that, by the actuator 102, the control lever 107 is movable (in particular in a translatory manner), to adjust an inclination of the holding rod 103 and the further holding rod 104. The coupling point of the holding rod 103 on the platform 120 and the coupling point of the further holding rod 104 on the platform 120 are spaced apart from the coupling point (center of rotation) of the dummy element 100 on the platform 120.

For example, the holding rods 103, 104 are respectively guided in a guiding rail 202 which is attached to the dummy element 100. At their free ends, the holding rods 103, 104 are hingedly coupled with the control lever 107. When the actuator 102 displaces the control lever 107 in a translatory manner in a direction, a pivoting of the holding rods 103, 104 around their center of rotation, e.g. at the platform 120, is induced. Thus, via the further coupling of the holding rods 103, 104 with the dummy element 100, also inclining the dummy element 100 is controlled.

A control unit 109 is arranged in the dummy element 100 and is configured to determine a corresponding inclination angle $\alpha$ based on a velocity of the dummy element 100 over the ground 111.

FIGS. 6 to 8 show a dummy system with a motorcycle driver as dummy element 100 and an inclination mechanism 102 with a holding rod 103, according to an exemplary embodiment of the present invention.

FIG. 9 shows a dummy system with a motorcycle driver as dummy element 100 and an inclination mechanism 101 with two individually controllable holding rods 103, 104, according to an exemplary embodiment of the present invention.

FIG. 10 shows a dummy system with a motorcycle driver as dummy element 100 and an inclination mechanism 102 with a hinged holding rod 106, according to an exemplary embodiment of the present invention.

For example, the hinged holding rod comprises a first portion which is rotatable with a rotatable actuator, and a second portion which is hingedly coupled with the first portion and the dummy element 100. When rotating the first portion, the second portion is moved (in particular in a translatory manner), in particular in a tangential direction of the rotation of the first portion, and is adjusted corresponding to the inclination angles $\alpha$ of the dummy element 100.

Figures 11, 12, 13, 14:
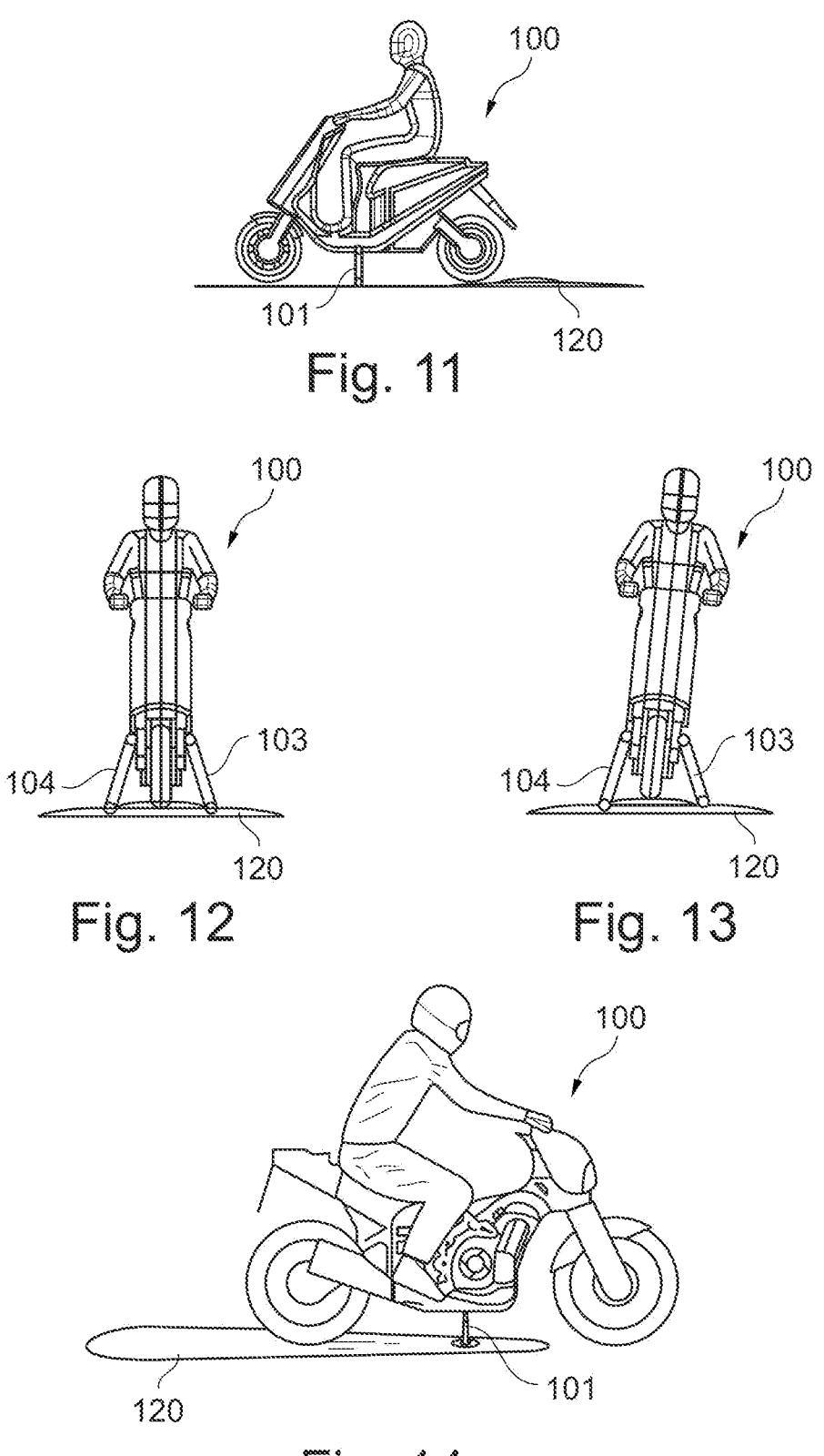
FIGS. 11 to 13 show a dummy system with a motorcycle driver as dummy element and an inclination mechanism with two holding rods, according to an exemplary embodi-ment of the present invention.
FIG. 14 shows a side view of a dummy system with a motorcycle driver as dummy element and an inclination mechanism with a holding rod, according to an exemplary embodiment of the present invention.

FIGS. 11 to 13 show a dummy system with a motorcycle driver as dummy element 100 and an inclination mechanism 102 with two holding rods 103, 104, according to an exemplary embodiment of the present invention.

FIG. 14 shows a side view of a dummy system with a motorcycle driver as dummy element 100 and an inclination mechanism 102, according to an exemplary embodiment of the present invention.

Figure 15:
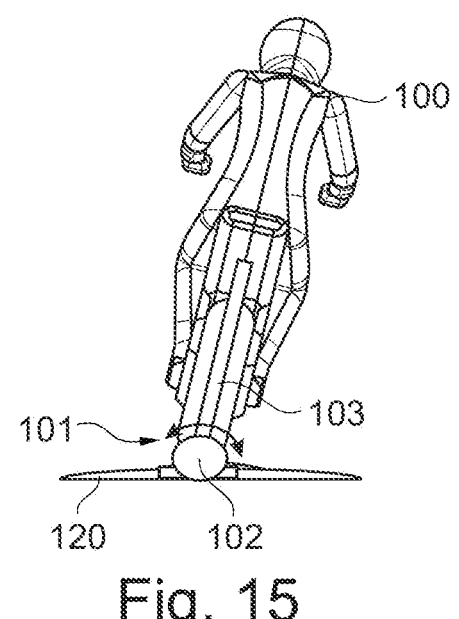
FIG. 15 shows a schematic illustration of a motorcycle as dummy element which is formed by a pivotable central holding rod, according to an exemplary embodiment of the present invention.

FIG. 15 shows a schematic illustration of a motorcycle as dummy element 100 which is formed by a pivotable central holding rod 103. The coupling point (center of rotation) of the holding rod 103 on the platform 120 may be the same as the coupling point (center of rotation) of the dummy element 100 on the platform 120.

The dummy element 100 is displaceable along the ground 111. Furthermore, the dummy system comprises an inclination mechanism 101, wherein the inclination mechanism 101 is coupled with the dummy element 100 and is configured such that the dummy element 100 is inclinable relatively to a ground 111. In particular, the dummy element 100 is arranged on a displaceable platform 120, wherein the inclination mechanism 101 adjusts the inclination angle $\alpha$ between the dummy element 100 and the displaceable platform 120.

The coupling device comprises a holding rod 103 which is coupled to the dummy element 100 and the actuator 102, such that the holding rod 103 is movable for inclining the dummy element 100 by the actuator 102.

The actuator 102 is arranged in or on the platform 120. A current source, in particular a (inflatable) battery may be arranged in the platform for a current supply of the actuator 102. The pivoting position of the holding rod 103 may be adjusted by the actuator 102, for example. For example, the actuator 102 is a rotatable control disk, at which the holding rod 102 is hingedly coupled. By rotating the control disk, a pivoting position of the holding rod 103 may be correspondingly adjusted.

Figure 16:
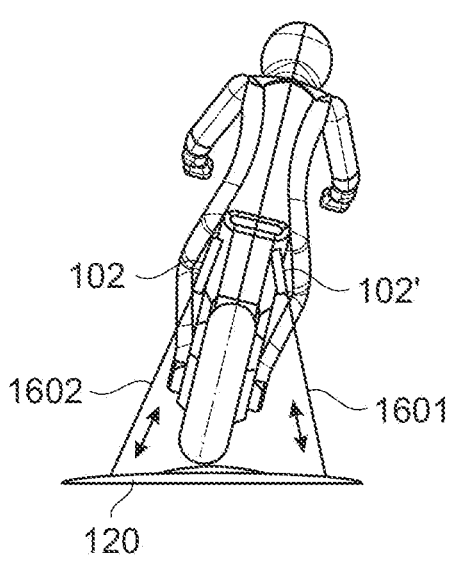
FIG. 16 shows a schematic illustration of a motorcycle as dummy element which is formed by traction ropes as coupling device and two assigned actuators, according to an exemplary embodiment of the present invention.

FIG. 16 shows a schematic illustration of a motorcycle as dummy element which is formed by traction ropes 1601, 1602 as coupling device and comprises two assigned actuators 102, 102'. Alternatively, in the shown arrangement, the traction ropes 1601, 1602 may be formed as holding rods 103, 104.

The traction rope 1601 is coupled with the platform 120 and the dummy element 100, such that, when pulling the traction rope 1601 by the actuator 102, an inclination of the dummy element 100 with respect to the platform 120 is adjustable. Correspondingly, the further traction rope 1602 is coupled with the platform 120 and the dummy element 100, such that, when pulling the traction rope 1602 by the actuator 102', an inclination of the dummy element 100 with respect to the platform 120 is adjustable. The coupling point of the traction rope 1601 on the platform 120 and the coupling point of the further traction rope 1602 on the platform 120 are spaced apart from the coupling point (center of rotation) of the dummy element 100 on the platform 120.

The dummy element 100 is arranged between the traction rope 1601 and the further traction rope 1602. The traction rope 1601 and the further traction rope 1602 are coupled with the platform 120 and the dummy element 100, such that, when pulling the traction rope 1601 and when releasing the further traction rope 1602 by the actuators 102, 102', which are respectively assigned to the respective traction rope 1601, 1602, an inclination of the dummy element 100 with respect to the platform 120 is adjustable. In other words, the respective traction rope 1601, 1602 pulls the dummy element in the corresponding inclination direction, to adjust a desired inclination angle α. The length of the rope of the other traction rope 1601, 1602 leads to a fixation of the dummy element 100 in the desired inclination position.

The actuator 102, 102' may comprise a drivable rope roller, for example, on which the traction rope 1601, 1602 is rollable and unrollable.

Figure 17:
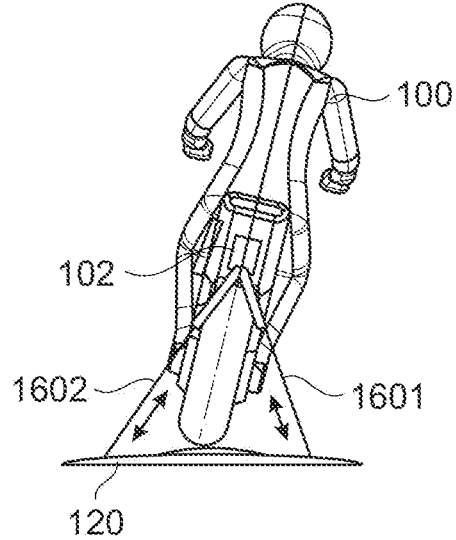
FIG. 17 shows a schematic illustration of a motorcycle as dummy element which is formed by traction ropes as coupling device and comprises a common actuator, according to an exemplary embodiment of the present invention.

FIG. 17 shows a schematic illustration of a motorcycle as dummy element 100, which, similar as in the embodiment of FIG. 16, is formed by traction ropes 1601, 1602 as coupling device. However, the traction ropes 1601, 1602 comprise a common actuator 102. The actuator 102 may be formed as drivable rope roller, for example, wherein both traction ropes 1601, 1602 are rolled on this rope roller. Both traction ropes 1601, 1602 comprise a different winding direction on the rope roller. A rotation of the rope roller in one direction thus leads to rolling the one and to unrolling the other traction rope 1601, 1602. Alternatively, the traction ropes 1601, 1602 may be formed by a common traction rope which is rolled on the rope roller and fixed to it, respectively, in a region.

Figure 18:
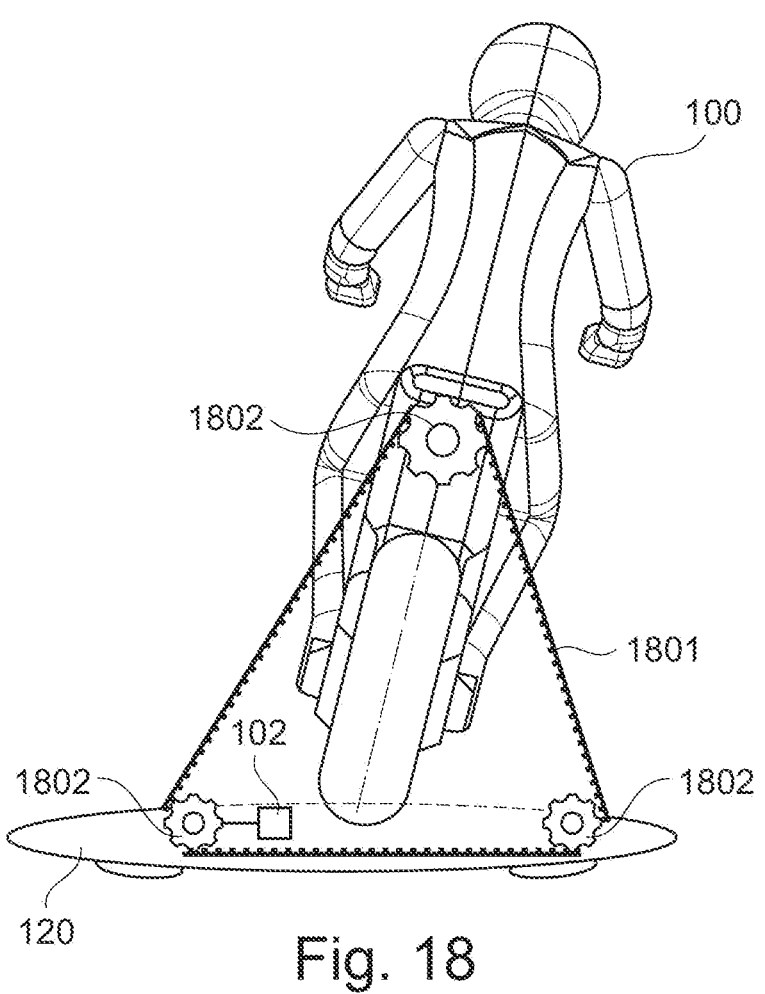
FIG. 18 shows a schematic illustration of a motorcycle as dummy element which is formed by a belt drive as coupling device, according to an exemplary embodiment of the present invention.

FIG. 18 shows a schematic illustration of a motorcycle as dummy element 100, which is formed by a belt drive as coupling device. The coupling device comprises a control belt 1801 and three (or more) belt rollers 1802 which are spaced apart, around which the control belt 1801 is guided. A belt roller 1802 is attached to the dummy element and two belt rollers 1802 are arranged at opposing sides of the dummy element 100 on the platform 120. The actuator 102 is coupled to at least one of the belt rollers 1802 for controlling it, such that, when rotating the belt roller 1802, the inclination of the dummy element 100 with respect to the platform 120 is adjustable. Thus, a belt drive is provided, by which the dummy element 100 may be exactly adjusted in a desired inclination angle α. Furthermore, the control belt 1801 may also be guided only over two belt rollers 1802, wherein one belt roller 1802 is attached to the dummy element, and the other belt roller 1802 is arranged on the platform 120.

The control belt 1801 may be configured as toothed belt and the belt rollers 1802 may comprise corresponding engagement teeth.

Figures 19, 20:
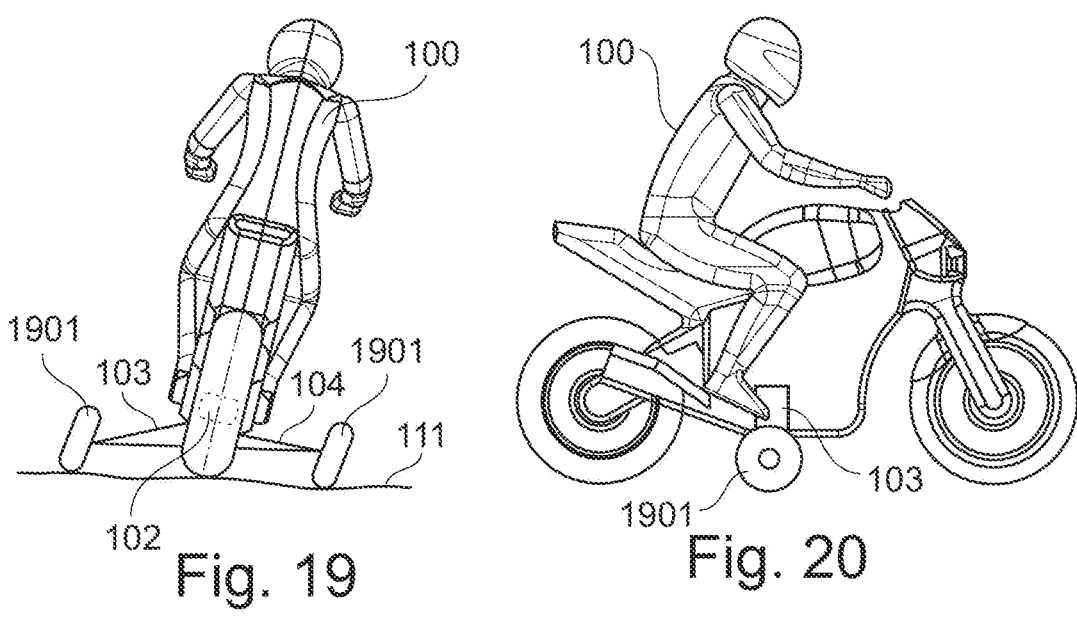
FIG. 19 and FIG. 20 show a schematic illustration of a motorcycle as dummy element which is formed by support wheels as coupling device, according to an exemplary embodiment of the present invention.

FIG. 19 and FIG. 20 show a schematic illustration of a motorcycle as dummy element 100 which is formed by support wheels 1901 as coupling device. The support wheels 1901 are coupled via corresponding holding rods 103, 104 to the dummy element 100, for example. In particular, the dummy element 100 is arranged between the holding rod 103 and the further holding rod 104. The holding rods 103, 104 are adjustable with respect to their length and pivotable between the support rollers 1901 and the dummy element 100. The length of the holding rods 103, 104 is adjustable via an actuator 102. Depending on the length of the holding rods 103, 104, the dummy element 100 inclines correspondingly.

Due to the configuration of the coupling device, it may be supported directly on the ground 111 by rollers, for example, to reduce a friction on the ground. Thus, an inclinable motorcycle dummy 100 may be provided, which displaces directly along the ground 111 without the need of a displaceable platform 120.

Figure 21:
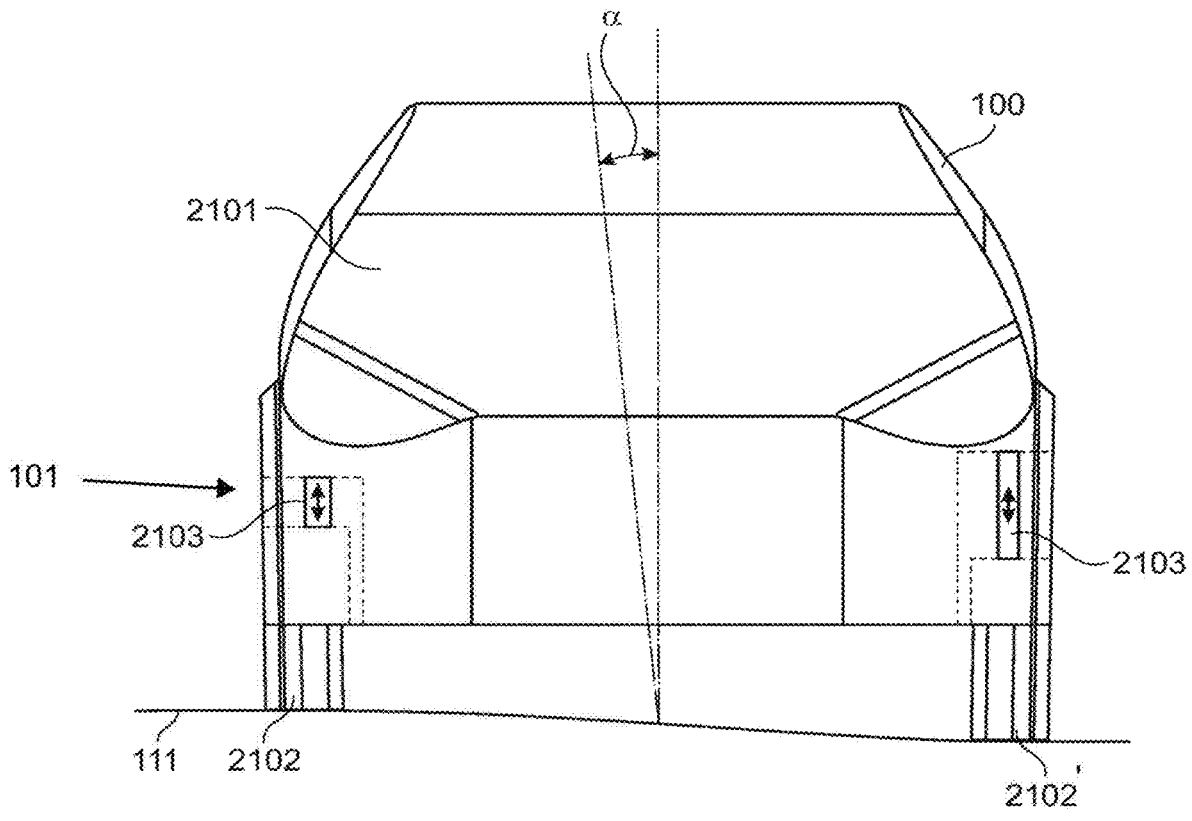
FIG. 21 shows a schematic illustration of a car as dummy element, according to an exemplary embodiment of the present invention.

FIG. 21 shows a schematic illustration of a car as dummy element 100. The car comprises a bodywork 2101 and at least one wheel 2102, wherein by the inclination mechanism 101, a distance between the bodywork 2101 and the wheel 2102 is adjustable. In particular, the inclination mechanism 101 is integrated in a shock absorber 2103 of the car. Furthermore, the inclination mechanism 101 may comprise a holding rod 103 which is arranged between the wheel 2102 and the bodywork 2101 in a retractable and extendable manner.

Furthermore, opposing to the wheel 2102, a further wheel 2102' may be provided, wherein by the inclination mechanism 101, a distance between the bodywork 2101 and the further wheel 2102' is adjustable. When the distance between the wheel 2102 and the bodywork 2101 is reduced, and the distance between the wheel 2102' and the bodywork 2101 is enlarged, the inclination angle α is adjusted. Thus, a pitching motion of the car while driving along a curve or also during a break application may be simulated.

Supplementary, it should be noted that "encompassing" does not exclude other elements or steps and "a" or "an" does not exclude a plurality. It is further noted that features or steps which are described with reference to one of the above embodiments may also be used in combination with other features or steps of other above described embodiments. Reference signs in the claims are not to be construed as limitation.

LIST OF REFERENCE SIGNS

100 dummy element
101 inclination mechanism
102 actuator/control disk
103 holding rod
104 further holding rod
106 hinged holding rod
107 control lever
108 hinge connection
109 control wheel
110 steerable wheel 111 bottom
120 displaceable platform
201 guiding rail/sleeve
1601 traction rope
1602 further traction rope
1801 control belt
1802 belt roller
1901 support roller
2101 bodywork
2102 wheel
2103 shock absorber

The invention claimed is:

1. A dummy system, comprising:
a dummy element which is displaceable along a ground,
an inclination mechanism,
wherein the inclination mechanism is coupled with the dummy element and configured such that the dummy element is inclinable relatively to the ground, and
a platform which is displaceable over the ground, on which the dummy element is inclinably attached,
wherein the platform comprises a base body which comprises a bottom surface and an opposing attachment surface and the base body is laid on the ground with its bottom surface, wherein in the bottom surface at least one roller element is drivably arranged by the base body and protrudes at least partially out of the base body and thus provides a distance between the base body and the ground,
wherein the inclination mechanism comprises an actuator and a coupling device,
wherein the actuator can move the coupling device in a translatory and/or rotational manner, such that an inclination of the dummy element is adjustable,
wherein the coupling device is made of a radar-transparent material.

2. The dummy system according to claim 1,
wherein the coupling device is arranged between the ground and the dummy element.

3. The dummy system according to claim 1,
wherein the coupling device comprises a holding rod which is coupled to the dummy element and the actuator, such that the holding rod is movable for inclining the dummy element by the actuator.

4. The dummy system according to claim 3, comprising at least one of the following features:
wherein the length of the holding rod is adjustable by the actuator,
wherein the holding rod is retractable and extendable;
wherein the holding rod is pivotally mounted to the dummy element, to adjust a distance to the ground and correspondingly the inclination by pivoting.

5. The dummy system according to claim 3,
wherein the coupling device comprises a further holding rod which is coupled to the dummy element and the actuator or a further actuator, such that the further holding rod is movable for inclining the dummy element by the actuator,
wherein the dummy element is arranged between the holding rod and the further holding rod.

6. The dummy system according to claim 5,
wherein the coupling device comprises a control lever which is hingedly coupled to the holding rod and the further holding rod,
wherein the control lever is coupled with the actuator, such that the control lever is movable by the actuator, to adjust an inclination of the holding rod and the further holding rod.

7. The dummy system according to claim 1,
wherein the coupling device is hingedly attached on the platform.

8. The dummy system according to claim 1,
wherein the actuator is arranged in or on the platform.

9. The dummy system according to claim 1, comprising at least one of the following features:
wherein a current source is arranged in the platform for a current supply of the battery;
wherein the coupling device comprises a holding rod which is pivotably arranged at the platform, which is pivotable by the actuator to incline the dummy element.

10. The dummy system according to claim 1,
wherein the coupling device comprises a traction rope which is coupled with the platform and the dummy element such that, when pulling the traction rope by the actuator, an inclination of the dummy element with respect to the platform is adjustable.

11. The dummy system according to claim 10,
wherein the coupling device comprises a further traction rope,
wherein the dummy element is arranged between the traction rope and the further traction rope,
wherein the traction rope and the further traction rope are coupled with the platform and the dummy element such that, when pulling the traction rope and when releasing the further traction rope by the actuator, an inclination of the dummy element with respect to the platform is adjustable.

12. The dummy system according to claim 1,
wherein the coupling device comprises a control belt and three belt rollers which are spaced apart around which the control belt is guided,
wherein one belt roller is attached to the dummy element and two belt rollers are arranged at two opposing sides of the dummy element on the platform,
wherein the actuator is coupled to at least one of the belt rollers for controlling it, such that, when rotating the belt roller, the inclination of the dummy element with respect to the platform is adjustable.

13. The dummy system according to claim 1,
wherein the dummy element comprises a steerable wheel,
wherein a steering angle of the steerable wheel is adjustable corresponding to an adjusted inclination angle.

14. The dummy system according to claim 1,
wherein the dummy element is a two-wheeler, a bicycle or a motorcycle.

15. The dummy system according to claim 1,
wherein the dummy element is a car.

16. The dummy system according to claim 15,
wherein the car comprises a bodywork and at least one wheel,
wherein by the inclination mechanism, a distance between the bodywork and the wheel is adjustable,
wherein the inclination mechanism is integrated in a shock absorber of the car.

17. A method of operating a dummy system, the method comprising:
providing a dummy system comprising a dummy element displaceable along a ground, an inclination mechanism coupled to the dummy element and configured such that the dummy element is inclinable relative to the ground, the dummy system comprising a platform which is displaceable over the ground, on which the dummy element is inclinably attached,
wherein the platform comprises a base body which comprises a bottom surface and an opposing attachment surface and the base body is laid on the ground with its bottom surface, wherein in the bottom surface at least one roller element is drivably arranged by the base body and protrudes at least partially out of the base body and thus provides a distance between the base body and the ground, wherein the inclination mechanism comprises an actuator and a coupling device, wherein the actuator can move the coupling device in a translatory and/or rotational manner, such that an inclination of the dummy element is adjustable, wherein the coupling device is made of a radar-transparent material; and inclining the dummy element relatively to the ground.

\* \* \* \* \*